United States Patent
Al-Jaf et al.

(10) Patent No.: US 11,644,344 B2
(45) Date of Patent: May 9, 2023

(54) MAGNETIC ENCODER

(71) Applicant: ZF Automotive UK Limited, Solihull (GB)

(72) Inventors: Ari Akbar Hassan Al-Jaf, Birmingham (GB); Harvey Smith, Worcestershire (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 17/188,000

(22) Filed: Mar. 1, 2021

(65) Prior Publication Data
US 2021/0278253 A1 Sep. 9, 2021

(30) Foreign Application Priority Data

Mar. 3, 2020 (GB) ...................................... 2003065

(51) Int. Cl.
*G01D 5/249* (2006.01)
*G01D 5/14* (2006.01)

(52) U.S. Cl.
CPC ........... *G01D 5/2497* (2013.01); *G01D 5/145* (2013.01)

(58) Field of Classification Search
CPC .............................. G01D 5/2497; G01D 5/145
See application file for complete search history.

(56) References Cited

U.S. PATENT DOCUMENTS

| | | | |
|---|---|---|---|
| 5,898,301 A | 4/1999 | La Croix et al. | |
| 7,573,259 B1 | 8/2009 | Kreger et al. | |
| 9,250,102 B2 * | 2/2016 | Takahashi | G01D 5/24438 |
| 2011/0187355 A1 | 8/2011 | Dixon et al. | |
| 2013/0063138 A1 | 3/2013 | Takahashi et al. | |
| 2017/0219380 A1 | 8/2017 | Schaefer | |

FOREIGN PATENT DOCUMENTS

WO 2007/084349 A1 7/2007

OTHER PUBLICATIONS

German Search Report for corresponding German Application Serial No. 203137-DE-NP, dated Aug. 12, 2021, pp. 1-10.
GB Search Report for corresponding Application Serial No. GB2003065. 6, dated Aug. 18, 2020, 1 page.

* cited by examiner

*Primary Examiner* — Walter L Lindsay, Jr.
*Assistant Examiner* — Milton Gonzalez
(74) *Attorney, Agent, or Firm* — Robert James Harwood

(57) ABSTRACT

A magnetic encoder includes one or more sensors and an encoder element having at least two tracks of encoder regions. Each region comprises a magnetic pole. Each sensor has one or more sensing elements associated with a respective track and generates an output that is indicative of the magnetic field associated with that track. At least one track has a differing number of poles to at least one of the other tracks. The properties of the poles of a first one of the tracks differ along the track such that there is a periodic variation along the first track of the magnetic field emitted by the first track that is detected by the sensing elements associated with the first track which at least partially cancels out a corresponding periodic variation in field from the other tracks that is also detected by the sensing elements associated with the first track.

12 Claims, 5 Drawing Sheets

MAGNETIC ENCODER

RELATED APPLICATIONS

The present invention claims priority from Application No. 2003065.6, filed 3 Mar. 2020, the entirety of which is incorporated herein by reference.

TECHNICAL FIELD

This invention relates to improvements in magnetic encoders, and in particular has application to small format multi-track linear or rotary encoders.

BACKGROUND

A linear or rotary magnetic encoder can be used to measure position and is commonly used to measure the linear motion or rotary position of an object such as a motor rotor. The encoder typically comprises three main components. The first is an encoder element that has a plurality of encoding regions arranged along at least one elongate track. For a linear encoder the track will be linear and extend from one end of the encoder to the other, and for a rotary encoder the track will be curved to form an endless annular track around an axis of rotation. A set of sensors are located adjacent the encoder that detects the passing of the encoder regions as the encoder translates or rotates around the axis, and finally a signal processor is provided that processes the output signals from the sensors. The encoder may function as an incremental encoder or an absolute position encoder, the difference lying in the way the sensor responds to the passing encoder regions and how the output signal is processed by the signal processor.

SUMMARY

In a typical magnetic encoder the encoder element comprises a set of magnetised regions arranged along a track comprising an alternating pattern or North and South poles. As the encoder moves, the poles move relative to the sensor. The sensor detects the changing magnetic field and this produces a corresponding change in the output of the sensor.

The magnetic poles can be formed by locally magnetising regions of a material which can be permanently magnetized, which may be formed into a disk or ring or other shape. In other arrangements individual magnets may be fixed to or embedded into a substrate at spaced locations to define the track.

In some applications it is beneficial to provide two tracks arranged in parallel for a linear encoder and around a common axis of rotation for a rotary encoder. If one track has wide magnetic poles and the other narrower magnetic poles, so that for a given length of track there are more poles on one track compared to the other, a high resolution incremental measurement can be taken using the sensors from the track with many poles combined with position in low resolution from the track with few poles. For instance, with a rotary encoder measuring the position of a motor rotor, when the motor starts, the first switch from the low resolution track can determine which way the rotor is pointing, and subsequently the track with many poles can provide very high resolution position for refined motor control.

The use of two parallel or concentric tracks may also provide the opportunity of fault diagnostics. For example, if when the sensors give a signal from the few pole track that does not agree with the signal from the many pole track, there may be a fault with one of the sensors.

Where there are two tracks, a set of sensors may be associated with each track with each set responding to the change in the magnetic field due to movements of magnets in a respective track. By using different numbers of encoder regions in each track and by offsetting at least some of the transitions between adjacent encoder regions of one track from those of the other track- or offsetting the sensors- and comparing the output from both sensing elements the position and direction of rotation can be determined. This is very well known in the art.

The applicant has identified a problem with magnetic encoders that have two adjacent tracks that is exaggerated where the encoder is small. In some applications, such as the measurement of the angular position and direction of a motor rotor the packaging constraints may be very severe which means that the encoder disk that carries the two concentrically tracks of magnets has to have a small diameter. This dictates the use of small magnetic encoder regions and packing those regions close together. The applicant has observed that the small size and close proximity of the magnets can result in the magnetic field from the magnets of the inner track affecting the magnetic field of the magnets of the outer track and vice versa. This interference will vary around the track due to the different numbers of magnets used in each track and the offset of magnets between tracks. Also, due to manufacturing tolerances, the location of the field sensors may vary from one encoder to the next, and hence the strength and harmonic content of the fields sensed from each of the different tracks as the disk rotates past the sensor elements will be different, and hence the harmonic content of the summation of the fields will be different, and hence the harmonic distortion of the sensor outputs will vary from one encoder to the next.

One object of the present invention is to provide an encoder element for use in a magnetic encoder that ameliorates the unwanted effect of harmonic noise due to the interaction of fields between tracks.

According to a first aspect the invention provides a magnetic encoder comprising an encoder element having at least two tracks of encoder regions, each region comprising a magnetic pole, the poles along each track being arranged as an alternating pattern of North and South poles, and one or more sensors, each sensor comprising one or more sensing elements associated with a respective track and generating an output that is indicative of the magnetic field associated with that track in the vicinity of the sensor, in which at least one track has a differing number of poles to at least one of the other tracks, and in which the properties of the poles of a first one of the tracks differ along the track such that there is a periodic variation along the first track of the magnetic field emitted by the first track that is detected by the sensing elements associated with the first track which at least partially cancels out a corresponding periodic variation in field from the other tracks that is also detected by the sensing elements associated with the first track.

The skilled person will understand that the term periodic variation in the context of the rotary motion of a rotary encoder refers to a harmonic frequency that can be observed in the output of the sensors assembly which is a harmonic of the rotational frequency of the encoder. For example a 4th order harmonic means 4 periods per one revolution. For a linear encoder where the poles move with a linear motion, the term harmonic refers to a frequency that can be observed in the output of the sensor assembly that is a function of the speed of the linear motion, with increase speed increasing the frequency of the periodic variation.

The periodic variation in field along the length of the first track may be achieved by using at least two different designs of poles to form the first track. For example, the two designs may be different in the properties of at least one of: shape, area, magnetic field strength and orientation compared with the poles of the other set, and proximity to geometrical features in the magnetized material or proximity to features in other magnetic components. The skilled person will understand that this is not an exhaustive list of possible design differences that may be employed.

The variation may additionally or alternatively be achieved by varying the spacing between poles along the track. For instance, one pair of adjacent poles may be separated by a wider gap compared to other pairs of adjacent poles along the track.

The poles may be considered to form two sets of poles; one of a first design and other of a second different design. It is within the scope of the invention for there to be more than two sets of poles, each of the sets having a different design to the other sets.

In a preferred arrangement, the designs each have different shapes but the magnetic strength and material used is otherwise the same so that the smaller poles are weaker than the larger ones.

Furthermore a magnetic material such as steel, iron, cobalt or other magnetic materials, might pass through or near some of the magnetic poles with the pole design being varied to include a hole through which the material can pass.

Where each set has a pole design with different shape to the design of the poles of the other set or sets, the shapes may be chosen to provide different areas for the poles in different sets, with the poles in one set of poles each having a smaller area than the poles of the other sets. A smaller area will result in a weaker magnetic field associated with that pole compared with an otherwise identical pole of a larger area.

The applicant has appreciated that changing the design of a set of poles, perhaps by removing material from some poles of the first track compared with others, decreases pole area to moderate the field in some poles to mitigate effects of superposition of field from the neighbouring track. Therefore, although an additional unwanted magnetic field from the second track is present in some regions it can be compensated for by an equal and opposite change to the actual magnetic field of the first track in those regions so that overall the unwanted magnetic field is not observed by the sensors.

The encoder element may comprise a disc, cuboid, cylinder, ring or tube of magnetic material, magnetized with two or more straight or annular tracks of alternating magnetic North and South poles, the sensing assembly being positioned so as to sense the field pattern from these tracks and generate an output which varies as the magnetized tracks move relative to the sensor assembly.

Different shapes poles may be provided by removing portions of magnetized material from the encoder element during manufacture, for example, provide holes through the material, straight edges, slots, corners, or other keying features.

The encoder element may be arranged such that poles of reduced field strength, for instance by having a reduced area, in the first track relative to other poles in that track Smaller field poles may be located where field from other tracks caused maximum reinforcement of the field from the first track. Larger poles may be provided where the field from other tracks causes maximum cancellation of field from the first track. Hence small poles may be located at only half the regions where interference is greatest.

The encoder may be a linear encoder in which case each track will comprise a linear array of poles arranged in parallel with the other track.

Alternatively the encoder may be a rotary encoder with the two tracks arranged around a common axis. The tracks may be arranged concentrically on a disk shaped element, or may be of the same radius but axially displaced from each other, hence parallel. In the later case the tracks may be formed on a tubular element.

Where the tracks are concentric the first track may be an outer track of a rotary encoder, or may be an inner track.

The first track may comprise a plurality of narrow poles compared with the wider poles of second track, such that the first track has more poles along a given length compared to the second track. By wide or narrow we refer to the width of the pole measured along the direction of the track, which will be around a circumference in the case of a rotary encoder.

The narrower poles of the first track may be cut-away at the inner radius of that track if that is closer to the second track, or the outer radius if that is closer to the second track, in order to provide an effective cancellation of fields from the second track interfering with fields from the first track.

Alternatively, the second track may comprise a plurality of narrow poles compared with the first track, such that the second track has more poles along a given length compared to the first track. In this case the narrower poles of the second track may be cut-away at the inner radius of that track if that is closer to the first track, or the outer radius if that is closer to the first track, in order to provide an effective cancellation of fields from the first track interfering with fields from the second track.

The track with the narrower poles will have more poles per unit length compared with the track with the wider poles. For instance, for every four poles of one track there may be sixteen poles of the other track.

The spacing between every pole of the two tracks may be the same. The spacing between the poles may be smaller than the distance between adjacent spaces.

The poles of the second track may all have the same design so that only the poles of the first track have more than one design.

Alternatively, both the first track and the second track may comprise two or more sets of poles, each having a different design to the other set. Each set may comprise one or more than one pole.

Whilst two sets of different design poles is a preferred arrangement, it is within the scope of this invention to have more than two designs for the poles of a track. In fact, each pole of the first track may have a different design to all the other poles, the poles being completely bespoke for the application.

For a rotary encoder within the scope of an aspect of this invention, each of the poles of the first track may have a perimeter when viewed along the axis of rotation of the encoder element, and the shape of the perimeter may be substantially the same around at least a major part of a perimeter.

For instance, where each pole has a perimeter defining four sides or edges, one or two or three of the edges may have the same shape on all poles of the first track.

One or more of the edges may be of the same length on all poles, for instance all of the inner edges may have the same shape and length. By inner we mean the edge closest to the axis that will extend generally circumferentially around the encoder element.

At least one of the edges that differ may comprise a match for an edge of another pole of the first track.

For instance, where there are two sets of poles one set may have an outer edge that is curved to follow a circumferential path of radius r around the axis of the encoder whereas the other set may have this edge defined as a straight line that forms a chord to the path r. The overall area of the second magnetic poles will therefor be smaller than the area of the first set.

The centre of the flats should preferably by in line with the border of similar pole of the inner and outer ring track. This means the centre of the flat should be in intersect with both north and south poles from high and low pole tracks.

As an alternative to a straight outer edge for the second shape of pole, another shape may be used which would also reduce the area of the poles such that effects of superposition of field from across the two tracks are reduced.

The poles may have a substantially uniform magnetisation across the whole of the pole.

Each pole may have a curved inner edge, and two radially extending linear outer edges.

The curved inner edges, where provided, may lie on a circular path that extends around an axis of rotation of the encoder.

Whilst changing the design of the outermost edge of a pole is described above, it is possible within the scope of this invention to vary the shape of the edge that is adjacent the other track of poles instead of as well. This will vary the spacing between the tracks in the vicinity of the pole, and will affect the inter-track field pattern.

One or more of the poles may be provided with at least one hole within the perimeter of the magnetised pole which may be unfilled or may be filled with a magnetic material that has a different field strength to the surrounding region of the pole so as to alter the magnetic field of the pole compared with other poles in the track.

Magnetic steel may be inserted within the holes in the pole to beneficially modify the magnetic field pattern.

In addition to or as an alternative to using different shapes for the poles, they may be modified so that have a different magnetic strength of field relative to the normal poles or by alteration of individual poles' pole arcs, or any combination of magnetisation, geometry and material removal or addition.

The encoder may be arranged such that where a North pole on a track with high number of poles is near a North pole on the other track with low number of poles, the area of the north poles on the large pole number track is decreased for large measurement gaps.

Alternatively the area of the special poles may be increased on the large pole number track for small measurement gaps. By measurement gap we mean the physical spacing between the encoder element track and an associated sensor of the complete encoder.

In a most preferred arrangement, the encoder element comprise two concentric annular tracks of magnetic encoder regions, each comprising a North or South pole, the outer track defining a first track comprising a first set of regular encoder regions and a second set of special regions, whereby the disk has a generally circular perimeter that defines an outer perimeter of the regular encoder regions and where an inner edge of one or more of the poles of the outer track differ from other poles of the outer track to achieve the desired compensation of the inter track field distortion.

The alternating encoder regions or poles of each track may define spaces between adjacent poles, and the spaces of the track having the lower number of regions may each be aligned radially with a space of the track with the higher number of regions.

At least one of the spaces between adjacent poles in one track may be offset circumferentially from the nearest space on the other track in a direction along the encoder tracks.

The encoder may have a substantially circular inner diameter.

The encoder element may comprise an outer track having 32 poles and an inner track having 8 poles. The applicant has found that using different shaped poles it is possible to greatly reduce undesirable 4th order harmonics present in such an encoder element.

In one arrangement, the outer track has four poles that are all the same shape but a different shape to the other poles of that track, for instance with flats on an outer edge rather than curved edges, and these different shaped poles may be aligned in a particular way relative to the poles on the inner and outer tracks.

Providing four poles with different shape to the others reduce 4th order interference especially when these are aligned to the boundaries of like polarity inner and outer poles.

In an alternative arrangement, the encoder element may be arranged such that the outer track of 32 poles comprises four sets of 8 adjacent poles numbered 1 to 8 from one end to the other, and where poles 1, 3, 6, and 8 are a different shape to poles 2, 4, 5 and 7 to reduce/cancel the 4th order field superposition by the inner track upon the outer magnet track of the magnetic disk.

Although there is a reduction of 4th order interference with this arrangement, the flats induce multiple of 2nd order harmonic (2nd, 6th, 8th . . . ) but with very small amplitude compared to the fundamental component (16th order).

This effect can be reduced by modifying the outer track magnets to cancel the effect. The modification can be reducing the similar poles strength of the high pole number tracks in different ways. It can be through reducing the magnetisation, reducing magnet pole arcs, or radially cutting the magnet either from inside or outside.

For small radius disks or large measurement gaps, the inner and outer track fields add. Hence the interference will be reduced by reducing the strength of North poles on the track with a high number of poles which are near North poles on the track with low number of poles.

For large track separation or small measurement gaps the inner and outer track fields add in opposition. Hence the interference will be reduced by reducing the strength of South poles on the track with a high number of poles which are near North poles on the track with low number of poles The rotary magnetic encoder may include a signal processor which receives the output from the sensors of the two sensor assemblies and processes the two outputs to provide a signal indicative of the angular position of the encoder element.

The magnetic encoder may comprise a rotary encoder where the encoder element has at least two concentric tracks of magnetic poles, each pole defining an encoder region.

According to a second aspect the invention provides a magnetic encoder comprising an encoder element for use in a rotary encoder assembly of the first aspect of the invention.

BRIEF DESCRIPTION OF THE DRAWINGS

There will now be described, by way of example only, various embodiments of the present invention with reference to the accompanying drawings of which.

DESCRIPTION

Figure 1:
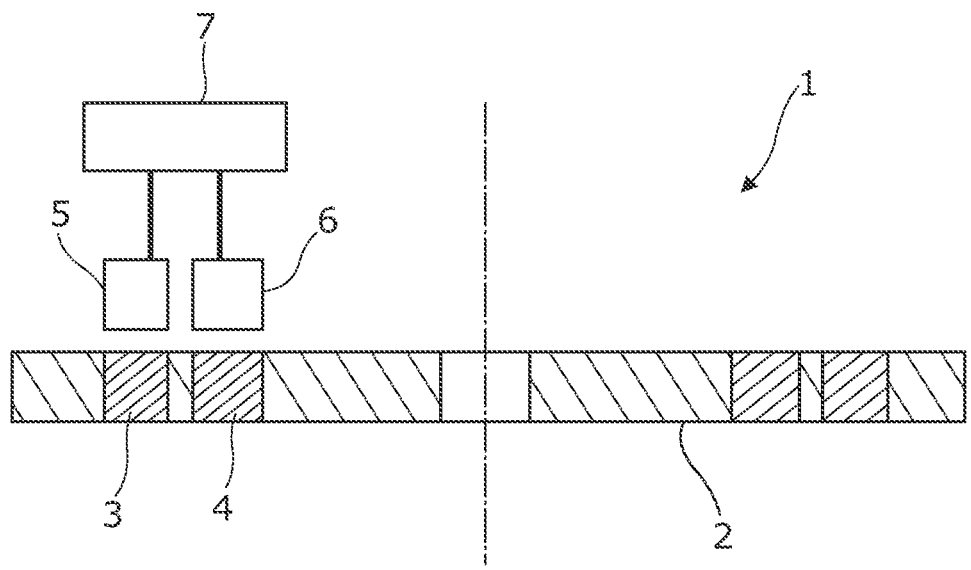
FIG. 1 is a cross sectional view showing the key components of a rotary encoder assembly in accordance with the present invention.
Figure 2:
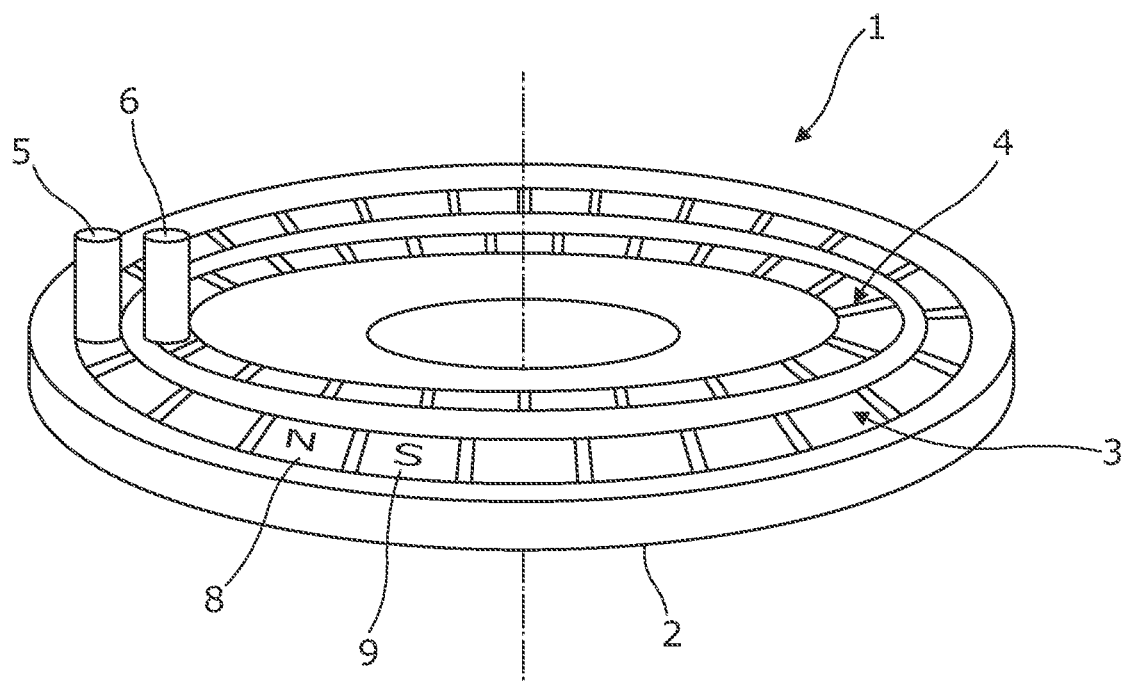
FIG. 2 is a perspective view of the rotary encoder assembly of FIG. 1.

As shown in FIGS. 1 and 2, a rotary encoder 1 in accordance with the present invention comprises an encoder element 2 in the form of a disk of magnetic material that can be permanently magnetized to form discrete poles within the disk. The disk has a central hole allowing it to be threaded onto a rotor shaft of a motor. The metal disk has a number of regions 8, 9 that are magnetised separated by regions of unmagnetised material. Each magnetised region forms a North or South magnetic pole. The poles are arranged to form two concentric tracks 3, 4 each centred on the axis of the metal disk. The outer track in this example comprises 32 poles arranged as alternating North and South poles that extend right to the outer edge of the metal disk. The inner track comprise 8 magnetic poles arranged as alternating North and South poles that extend right to the inner edge of the disk. In other examples there may be different numbers of poles in the inner and outer tracks. Taking the poles to the edges allows the size of the poles to be maximised for a given size of disk, which is important where the size of the disk is limited due to the geometry of the location in which the encoder is to be placed in use.

Two sensor assemblies 5, 6 are provided, each comprising multiple magnetic sensor elements that are responsive to magnetic field. One sensor assembly 5 is placed with its detecting region adjacent the first track 3 and the other sensor 6 is placed such that its sensing region is adjacent the second track 4. The output of the two sensors 5, 6 is fed into a signal processing unit 7. This signal processing unit processes the signals to produce a measurement of the angular position of the metal disk relative to the sensors in a conventional manner.

In the examples of a rotary encoder, the encoder element has a small overall diameter with a nominal inner diameter of around 12 mm and a nominal outer diameter of around 19 mm. The range of the axial height between the surface of the encoder element and each of the two sensors is between 0.8-1.5 mm.

The applicant has appreciated that for small diameter encoders there is a high likelihood of inter-track magnetic interference. This may manifest as harmonic distortion of the signal output form each sensor compared with the ideal signal that would be present when there was no interference. For an encoder as shown in FIG. 2 with two tracks each having identical poles spaced around the track, the applicant observed that at the minimum height, the inner track field is strong enough that the outer track field 4th order effect on that inner track is very low and does not interfere. However, the further the sensor, the cross-talk between the inner and outer track becomes higher which is mainly due to lower field amplitude of the outer track compared to the inner track. On the other hand a strong fourth order harmonic was observed where the magnetic field of the inner track interferes with the outer track. The problem is also more exaggerated for small diameter sensor elements because the field strength of the relatively large poles decays less quickly with distance than from the small poles, hence more interference at larger gaps between the poles and sensor elements.

The applicant has proposed an alternative arrangement of encoder element which ameliorates the inter-track magnetic field interference. Several different embodiments of an encoder element for use in a rotary magnetic encoder assembly of the type shown in FIGS. 1 and 2 are shown in FIGS. 3 to 10. In the case of the examples of FIGS. 3 to 9, the arrangement reduces the interference between the inner one of the tracks on the outer track to reduce $4^{th}$ order interference, and in the case of FIG. 10 the inner tracks effect on the other track is reduced and also the outer tracks effect on the inner track is reduced to reduce $16^{th}$ order interference of the inner track.

Figure 3:
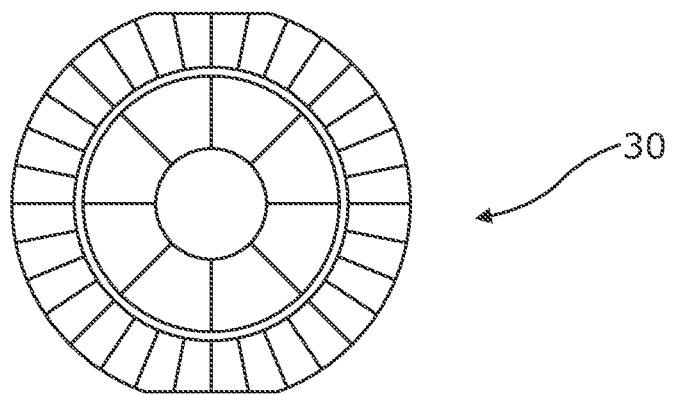
FIG. 3 shows an encoder element in plan view having two flats formed around an otherwise circular outer perimeter.
Figure 4:
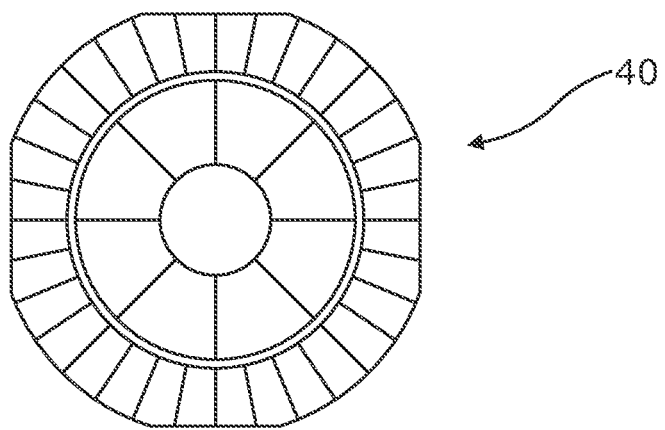
FIG. 4 shows an encoder element in plan view having four flats formed around an otherwise circular outer perimeter.
Figure 5:
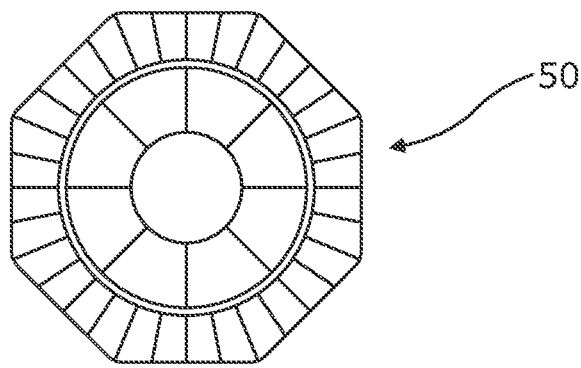
FIG. 5 shows an encoder element in plan view having eight flats formed around an otherwise circular outer perimeter.

FIG. 3 shows an encoder element 30 in plan view having two flats formed around an otherwise circular outer perimeter. FIG. 4 shows an encoder element 40 in plan view having four flats formed around an otherwise circular outer perimeter, and FIG. 5 shows an encoder element 50 in plan view having eight flats formed around an otherwise circular outer perimeter. In each case, a reduction in harmonics in the signal output form the sensor associated with the outer track is observed. In each of these examples, the $4^{th}$ order interference on the outer track is reduced with the example of FIG. 4 being optimal. The presence of the flats means that the poles of the outer track comprise a number of different designs, each design in this case comprising a pole with a different shape. Some will have portions cut away by the flats but in each case all of the magnetic poles may extend right to the outer edge of the disk.

Other ways to vary the design may comprise changing the field strength of a pole but keeping the shapes of all poles the same.

Figure 6:
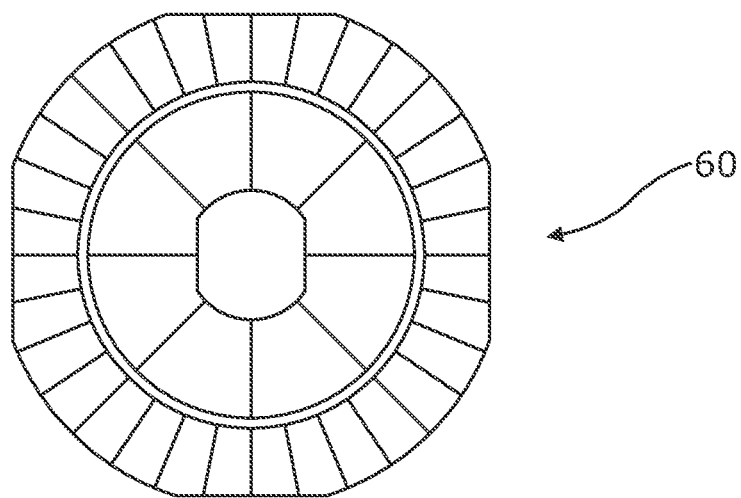
FIG. 6 shows an encoder having four flats formed around an otherwise circular outer perimeter and two flats on an otherwise circular inner perimeter.

FIG. 6 shows an encoder element 60 in which these flats rotated through 90 degrees.

Figure 7:
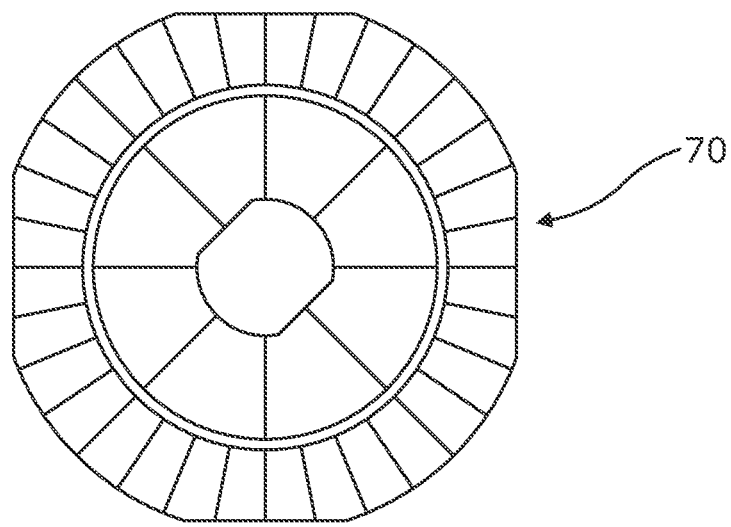
FIG. 7 shows an encoder corresponding to FIG. 7 in which the orientation of the inner two flat is rotated through 45 degrees.

In FIGS. 3 to 5 the inner track North Pole boundary is aligned with the outer track north pole boundary and intersects the middle of the flats. FIG. 7 shows an arrangement of an encoder element 70 in which the inner track is rotated by one pole (45 mechanical degrees) hence the inner track North Pole boundary aligns with the outer track South Pole boundary and intersects the middle of the flats. The applicant observed that the dominant orders in inner track field is not affected hence the alignment between tracks does not affect the inner track significantly. Note that the flats on the inner diameter have also rotated with the inner poles.

However, the applicant also observed that the effect of inner track's fundamental harmonic (4th order) on the outer tracks field is significantly different when the flats' alignment change. The arrangement of FIG. 6 improves on the performance of the example of FIG. 7, the 4th order harmonic in the arrangement of FIG. 6 being considerably reduced for the outer track field as the flats generate a 4th order harmonic in the outer track which is out of phase with the inner tracks fundamental component If the inner track is removed and 4 flats present, the phase of the 4th order harmonic of the outer track is 180 electrical degrees out of phase with the inner track field in its original orientation, and in phase with the inner track field if the inner track were rotated by 45°.

Hence with the orientation of flats and poles shown in shown in FIG. 6, the applicant has appreciated that 4th order harmonic induced in the outer track field by the flats partially cancels the 4th order harmonic from the inner track, whereas with the orientation shown in FIG. 7 the 4th order harmonics add in phase to each other and the amplitude of the 4th order harmonic increases.

This makes aligning the flats relative to the inner track important.

It can be shown that reducing poles in the outer track of like polarity to the neighbouring poles in the inner has is most effective at reducing the 4th order cross-coupling. On the other hand, if outer track poles of opposite polarity to the neighbouring inner track poles are reduced, this will increase the 4th order interference.

Figure 8:
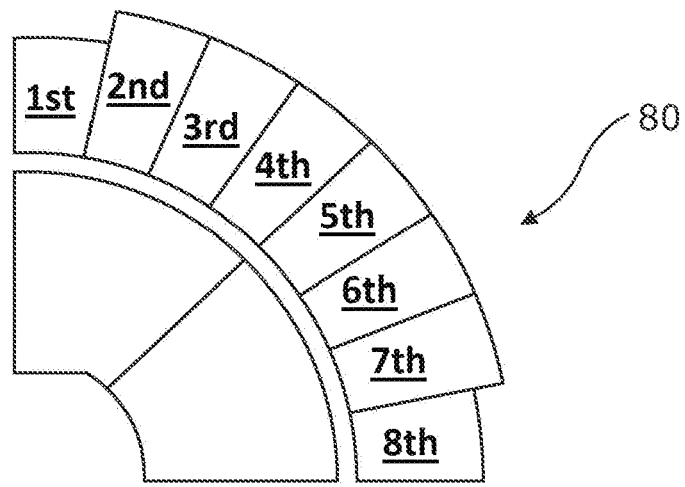
FIG. 8 shows a set of 8 adjacent outer poles of a 32 pole outer track in which a central set of poles are enlarged compared with the two end poles
Figure 9:
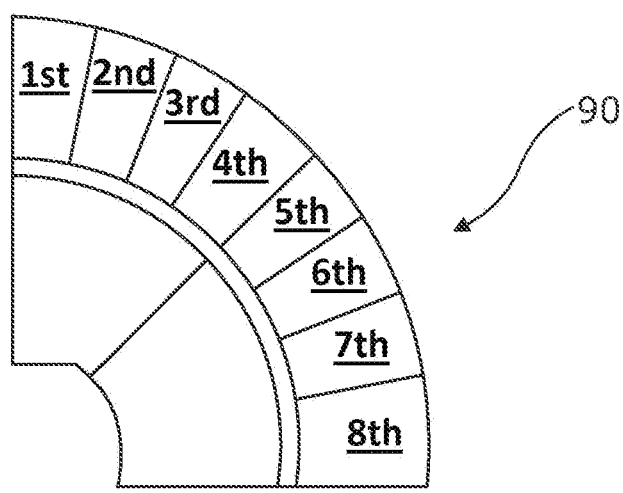
FIG. 9 shows a similar to arrangement as FIG. 8 where steel inserts are provided on the outer edge of the end poles to align with the outer edge of the enlarged central poles giving magnetic poles of different strengths, the lighter shaded poles having a reduced field strength compared with the darker shaded poles as a consequence.

FIGS. 8 and 9 show alternative embodiments of an encoder element 80, 90. An eight magnetic pole-segment of the outer track of the encoder elements 80, 90 is depicted in FIGS. 8 and 9, where the eight magnetic poles of each outer track are labeled as $1^{st}$ through $8^{th}$ magnetic poles. Reducing magnet 1, 3, 6, and 8 would be the best-case scenario to achieve minimum 4th order cross-talk. Although, lower Br reduces the 4th order, it also leads to multiple of 4th order harmonic. This is shown on the encoder element 90 shown in FIG. 9.

Figure 10A:
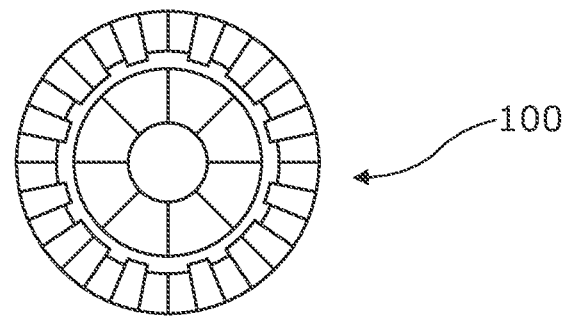
FIGS. 10 (a) to (c) show three different designs which provide for a significant reduction in the fourth order harmonics that would be present if all of the poles of the outer track were identical and all the poles of the inner track were identical.
Figure 10B:
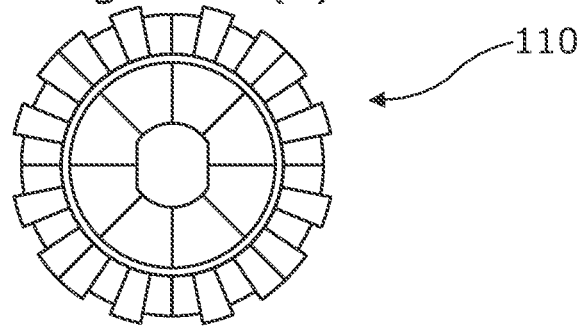
Figure 10C:
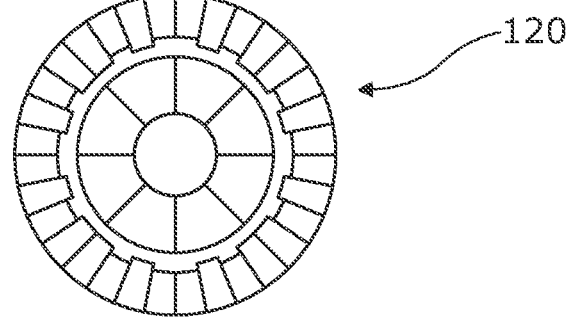

Further alternative embodiments of an encoder element 100, 110, 120 are shown in FIGS. 10 (a) to (c). In each of these examples the outer poles are divided into two sets, one set having an outer perimeter edge that is further from the axis of the metal disk than the second set—FIG. 10(b) or having an outer perimeter edge that is further from the axis as shown in FIGS. 10 (a) and 10(c). The difference between FIGS. 10a and 10c is that the reduced bits in FIG. 10a have been replaced by steel inserts to see what happens if we put rivets within the magnet disk which are magnetic. However, the space between the tracks in FIG. 10c is considered to be air (non-magnetised material).

Figure 11:
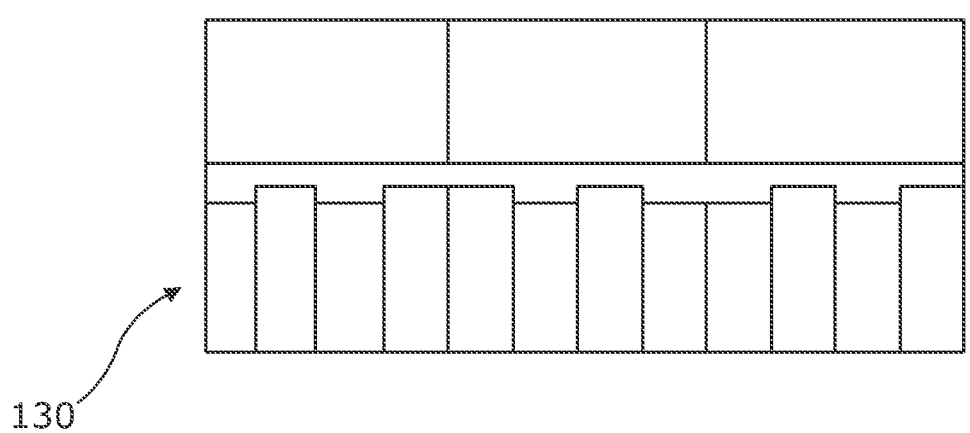
FIG. 11 is an example of a linear encoder element for use in a linear implementation of the invention.

FIG. 11 shows how the invention can be applied to a linear encoder element, with an section of an encoder element being shown, the section being repeated as required depending on how long the encoder. As shown one track has three elements for every 12 of the other track and the track with the narrower poles has two different pole shapes. The inner edge of the poles facing the track with the wider poles is varied between the two designs, the magnetisation and shape and material otherwise being the same.

What is claimed is:

1. A magnetic encoder comprising an encoder element having at least two tracks of encoder regions, each track (3, 4) being bounded in a direction transverse to a length of the track by opposite first and second bounding edges, at least one of the bounding edges of a first one of the tracks facing toward an adjacent bounding edge of another of the tracks, each region comprising a magnetic pole, the poles of each track being arranged as an alternating pattern of North and South poles along the length of each track, and one or more sensors, each sensor comprising one or more sensing elements associated with a respective track and generating an output that is indicative of the magnetic field associated with that track in the vicinity of the sensor, in which at least one track has a differing number of poles to at least one of the other tracks, and in which the poles of a first one of the tracks are configured such that a distance between the first and second bounding edges of the first track varies along the length of the first track such that there is a periodic variation along the first track of the magnetic field emitted by the first track that is detected by the sensing elements associated with the first track which at least partially cancels out a corresponding periodic variation in field from the other tracks that is also detected by the sensing elements associated with the first track.

2. The magnetic encoder according to claim 1 in which the magnetic field reaching the sensors from some poles of the first track is weaker than for others.

3. The magnetic encoder according to claim 2 in which at least one of the poles of the first track differs from at least one other of the poles of the first track by having.

4. The magnetic encoder according to claim 1 in which the first track comprises a plurality of narrow poles compared with wider poles of a second track, such that the first track has more poles along a given length compared to the second track.

5. The magnetic encoder according to claim 1 in which the encoder element is a linear encoder element, each track comprising a linear array of the poles arranged in parallel with the other tracks.

6. The magnetic encoder according to claim 1 in which the encoder element is a disk-shaped, rotary encoder element, each of the tracks being arranged around a common axis.

7. The magnetic encoder according to claim 6 in which one or more of the narrower poles of the first track are cut-away at the inner radius of that track compared with other poles of the first track if that is closer to the second track, or cut away at the outer radius if that is closer to the second track, in order to provide the desired cancellation of fields from the second track interfering with fields from the first track.

8. The magnetic encoder according to claim 1, wherein the encoder element is either:

a linear encoder element, each track of the linear encoder element comprising a linear array of the poles arranged in parallel with the other tracks; or a disk-shaped, rotary encoder element, each track of the rotary encoder element being arranged around a common axis.

9. A magnetic encoder, comprising:

a disk-shaped, rotary encoder element having at least two tracks of encoder regions, each region comprising a magnetic pole, the poles along each track being arranged as an alternating pattern of North and South poles, the poles of a first one of the tracks each having a first edge that defines a portion of a periphery of the encoder element, the poles of the first track comprising first and second sets of poles, the first edges of the first set of poles being curved to follow a circumferential path of a predetermined radius around an axis of the encoder element, the first edges of the second set of poles defining a straight line that forms a chord to the circumferential path of the predetermined radius; and at least one sensor, each sensor comprising at least one sensing element associated with a respective track and generating an output that is indicative of the magnetic field associated with that track in the vicinity of the sensor;

wherein the first edge differences of the first and second sets of poles provides for a periodic variation along the first track of a magnetic field that is emitted by the first track and detected by the at least one sensing element associated with the first track.

10. The magnetic encoder according to claim 9, wherein at least one track has a differing number of poles to at least one of the other tracks.

11. The magnetic encoder according to claim 9, wherein the magnetic field reaching the sensors from some poles of the first track is weaker than for others.

12. The magnetic encoder according to claim 9, wherein the first track comprises a plurality of narrow poles compared with wider poles of a second track, such that the first track has more poles along a given length compared to the second track.

* * * * *